Figure 1:
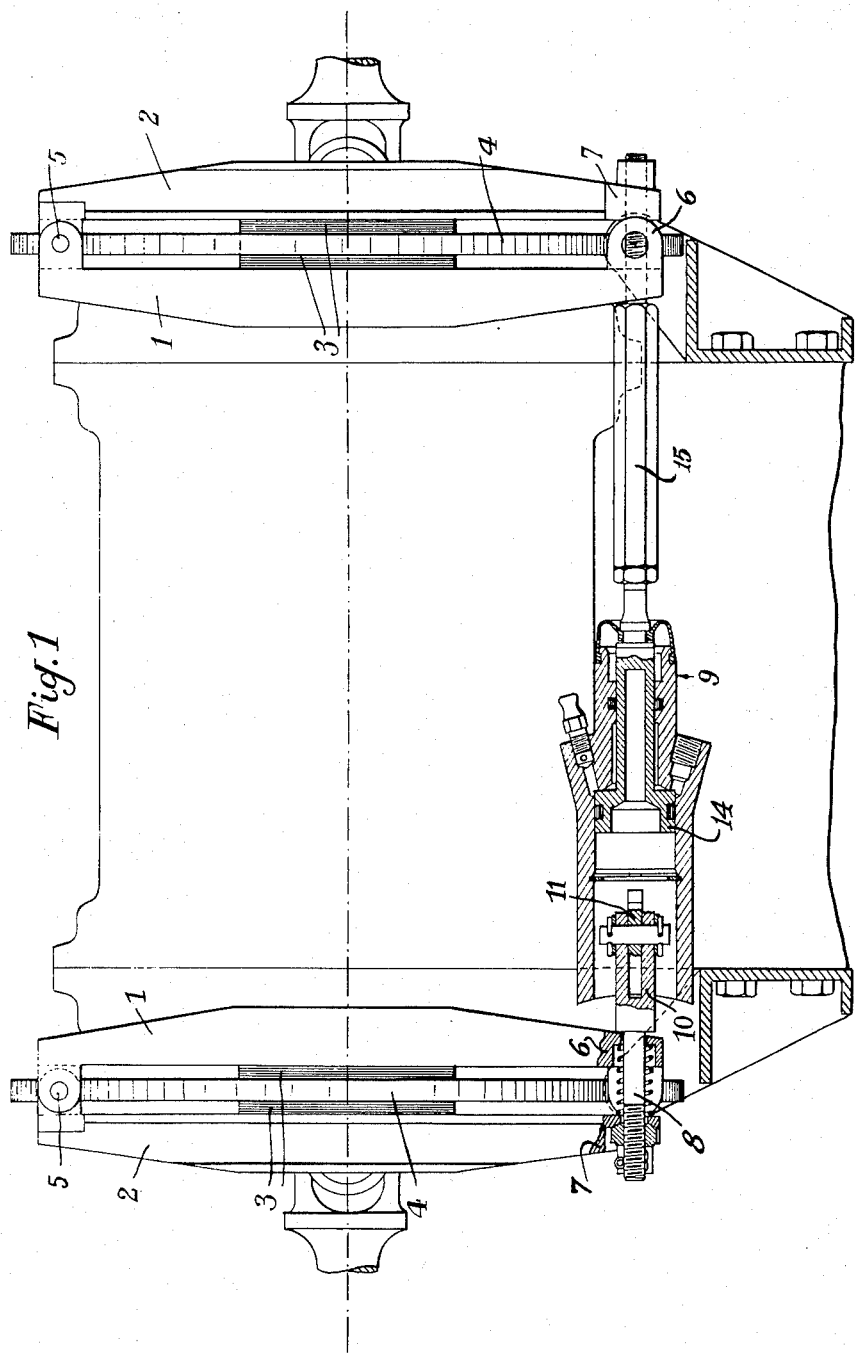

Aug. 3, 1965  A. BRUEDER  3,198,292
DISC BRAKES WITH CONJUGATE JAWS
Filed May 21, 1963  3 Sheets-Sheet 1

United States Patent Office 3,198,292
Patented Aug. 3, 1965

3,198,292
DISC BRAKES WITH CONJUGATE JAWS
Antoine Brueder, Paris, France, assignor to Societe Anonyme Andre Citroen, Paris, France
Filed May 21, 1963, Ser. No. 282,010
Claims priority, application France, May 28, 1962, 898,949, Patent 1,334,990
2 Claims. (Cl. 188—73)

This invention relates to disc brakes for automobile vehicles and has specific reference to a simplified disc brake construction of the hinged jaw type, characterized in that it comprises means for exerting the braking effort without resorting to any control lever by operating directly the brake lining-carrying jaws.

This arrangement is advantageous notably in that it preserves the possibility of applying the brakes by operating a single brake cylinder, and that the brake can be anchored at one point only. Furthermore, due to a convenient construction of the brake-lining carrying jaws any play resulting from normal lining wear is taken up automatically.

According to a preferred form of embodiment, the two jaws are pivoted on each other at one end and the inner jaw has its opposite end pivoted on a support solid with the chassis of the vehicle or with an element fixed in relation to the axle. This last-named pivotal mounting is so disposed that the inner jaw is movable in a direction at right angles to the plane of the brake disc while holding this jaw in position according to a predetermined chord of a fixed circle concentric to the same disc. The outer jaw has a recess or socket formed through its free end which permits the passage and anchoring of a rod adapted to transmit the tractive effort of the brake cylinder and to exert, by reacting against the other jaw, the pressure necessary for braking the relevant disc.

With this brake jaw arrangement, only one brake cylinder is necessary for clamping the two discs and the two brakes of a two-wheeled axle can be controlled from a single brake cylinder if these two brakes are connected to the fixed portion of the axle or to a common element thereof.

Figure 2:
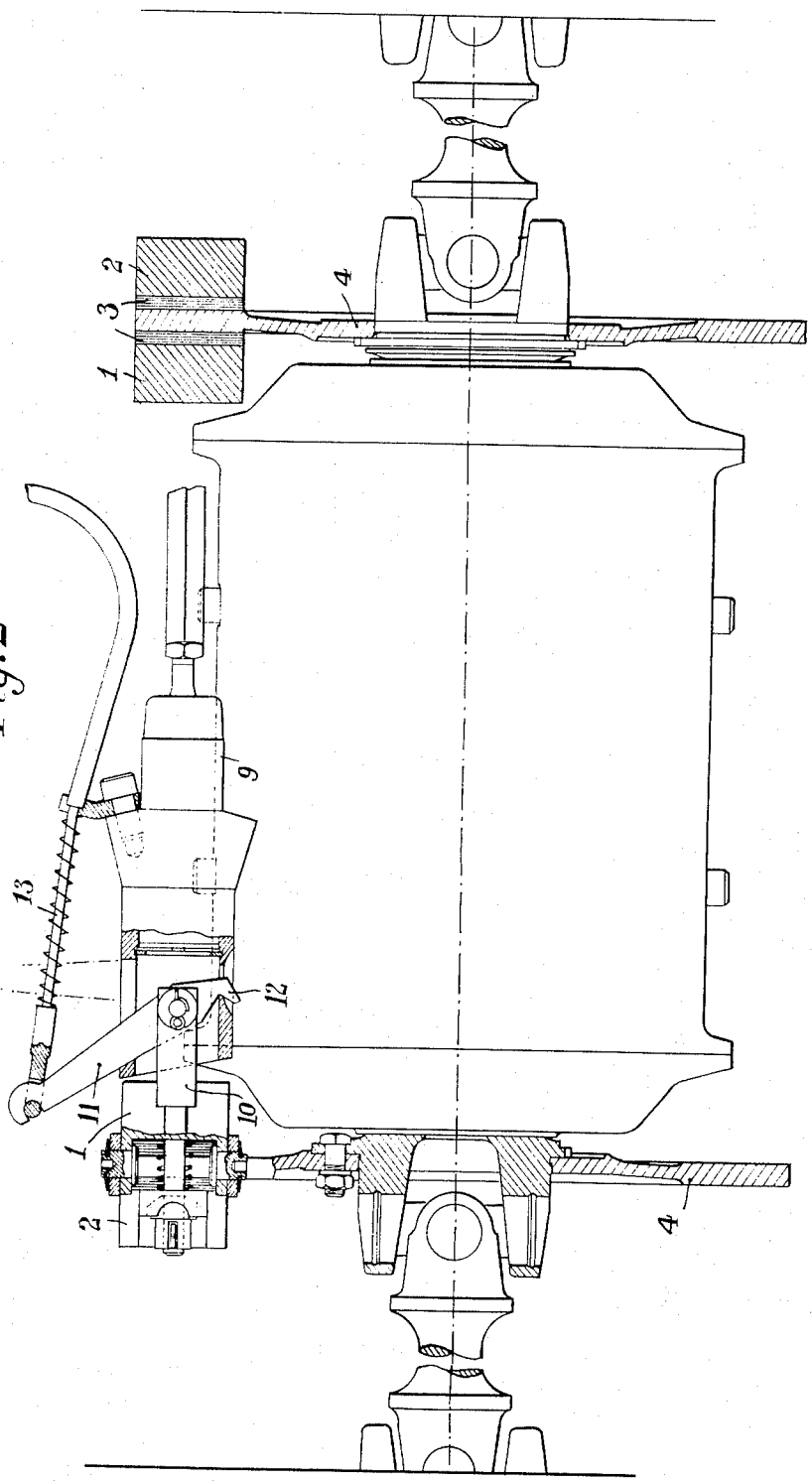
Figure 3:
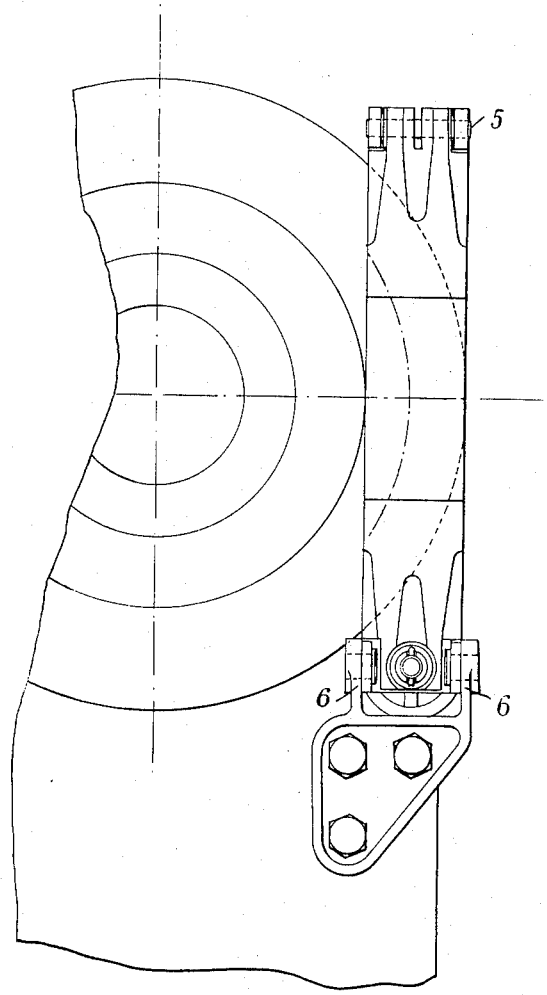

A typical form of embodiment of a disc brake mounting with conjugate jaws according to the present invention will be described hereinafter with reference to the accompanying drawings. In the drawings:

FIGURES 1 and 2 are part-sectional views showing an axle of an automobile vehicle, the sections being taken along a horizontal plane and a vertical plane respectively, and FIGURE 3 is a side elevational view.

This disc brake comprises as in conventional constructions two jaws 1, 2 carrying brake linings 3 adapted to clamp a disc 4 rotatably rigid with the desired road wheel of the vehicle. These two jaws are pivotally interconnected at one end about a pin 5, and the inner jaw 1 is pivoted at its other end on a support 6 secured on the chassis or other element fixed in relation to the axle. The outer jaw 2 is provided at its free end with a recess 7 permitting the passage and anchoring of a rod 8 for transmitting the tractive effort exerted by the brake cylinder 9 and developing by reaction on the other jaw 1 the pressure necessary for applying the brake by clamping the disc. The rod 8 associated with piston 14 includes a threaded adjustment member 15 to vary the length of said rod in dependency upon friction pad wear.

With this jaw arrangement it is not necessary to rigidly secure the brake cylinder, so that a "floating" mounting of this cylinder between the two discs of a same axle can be resorted to.

With this type of brake the use of trapezoidal-section brake linings having a greater thickness on the jaw side receiving the power braking effort is recommended. Thus, the wear developing more rapidly on this side of the lining due to the locally higher pressure exerted on the disc can take place without any risk of abnormally reducing the thickness of, or even partially destroying, the brake lining. The specific trapezoidal shape to be used depends essentially on parameters such as braking characteristics and lining quality, so that when the linings are worn to the maximum the minimum thickness is obtained and the wear is distributed nearly uniformly.

The same control may be arranged with a view to include the emergency or so-called handbrake.

According to a preferred form of embodiment, the inner end of the rod 8 of one of the disc brakes incorporates a strap 10 having pivoted thereon a two-armed lever 11 engaging with its lower, shorter arm 12 a notch or recess formed in the brake cylinder, the other arm of this lever being connected as usual through a cable or like flexible control element 13 to the emergency handbrake or brake pedal, according to the arrangement contemplated.

A specific feature of this "series" mounting is that a reaction is produced in the main brake pedal when the emergency or handbrake is actuated. This fact is considered in most circumstances as devoid of any inconvenience and may even provide a useful indication as to the efficiency of the control action.

A so-called "parallel" mounting could also be contemplated wherein the emergency control action would react upon the two traction rods of the brake jaws, with a free movement of the rod coupled to the brake cylinder in relation to this cylinder, in a direction opposed to that in which the tractive force is applied.

Of course, in this alternate mounting the emergency brake action would not react in any manner with the main brake.

Finally, it will be readily understood by anybody conversant with the art that many modifications and alterations may be brought to the form of embodiment shown and described herein, without however departing from the spirit and scope of the invention as set forth in the appended claims.

What I claim is:

1. Twin disc brakes for vehicles, comprising two brake discs each rigid with a vehicle wheel, a pair of elongated jaws comprising an inner jaw and an outer jaw disposed on opposite sides of each disc and positioned in chordal relation to an outer peripheral portion of the respective disc, with opposite ends of the jaws extending beyond the periphery of the disc, a friction lining fixed on a central portion of each of said jaws in position to engage the respective disc, means pivotally connecting first ends of the two jaws of each pair directly to one another with a single pivotal axis, means pivotally connecting the second end of the inner jaw of each pair to a fixed portion of the vehicle, tension members pivotally connected respectively to the second ends of the outer jaws of said pairs, said tension members extending toward one another through openings in the second ends of the respective inner jaws, a floating cylinder connected to one of said tension members, a piston in said cylinder connected to the other of said tension members and means for supplying pressure fluid to said cylinder to draw said tension members and outer jaws toward one another and thereby apply said friction linings on said jaws to said discs, the reactive forces of said discs on said inner jaws being taken solely and directly by said pivotal connections of said second ends of said inner jaws to said fixed portions of the vehicle and the reaction forces of said discs on said outer jaws being taken solely and directly by the pivotal connections between the first ends of the jaws of each pair and thereby transmitted through said inner jaws to said fixed portions of the vehicle.

2. Twin disc brakes according to claim 1, in which the connection between said one tension member and said cylinder comprises a transverse lever pivotally connected to said one tension member and having one end engaging a portion of said cylinder and manually operable means connected to the opposite end of said lever to swing said lever about its pivot and thereby move said one tension member longitudinally relative to said cylinder.

References Cited by the Examiner

UNITED STATES PATENTS

| | | | |
|---|---|---|---|
| 2,334,169 | 11/43 | Aurien | 188—59 |
| 2,768,710 | 10/56 | Butler | 188—152 |
| 2,781,106 | 2/57 | Lucien | 188—152 |
| 2,790,516 | 4/57 | Wright et al. | 188—152 |
| 2,907,412 | 10/59 | Butler | 188—73 |
| 3,027,976 | 4/62 | Soddy | 188—59 |

ARTHUR L. LA POINT, *Primary Examiner.*

EUGENE G. BOTZ, *Examiner.*